United States Patent [19]

Axelrod

[11] Patent Number: 4,771,733

[45] Date of Patent: Sep. 20, 1988

[54] CHEWABLE OBJECT HAVING FLAVOR OR ODOR EXTRACT INCORPORATED THEREIN

[76] Inventor: Herbert R. Axelrod, 6 Marine Pl., Deal, N.J. 07753

[21] Appl. No.: 908,220

[22] Filed: Sep. 17, 1986

[51] Int. Cl.⁴ ............................................. A01K 29/00
[52] U.S. Cl. ................................................... 119/29.5
[58] Field of Search .................. 119/29.5; 428/15, 16, 428/317.9; 426/104, 132, 420, 805, 289, 512

[56] References Cited

U.S. PATENT DOCUMENTS

| | | | |
|---|---|---|---|
| 2,185,547 | 1/1940 | Fowler | 119/29.5 |
| 2,610,851 | 9/1952 | Jones | 119/29.5 |
| 3,104,648 | 9/1963 | Fisher | 119/29.5 X |
| 3,871,334 | 3/1975 | Axelrod | 119/29.5 |
| 4,513,014 | 4/1985 | Edwards | 119/29.5 X |
| 4,557,219 | 12/1985 | Edwards | 119/29.5 |

Primary Examiner—Carl D. Friedman
Assistant Examiner—Creighton Smith
Attorney, Agent, or Firm—Fulwider, Patton, Rieber, Lee & Utecht

[57] ABSTRACT

This invention relates to an improved chewable object or toy formed from a polyurethane resin having an aqueous based flavor or odor incorporated therein after the object or toy has been formed. The object or toy is particularly suitable for domestic animals such as dogs and cats.

9 Claims, 1 Drawing Sheet

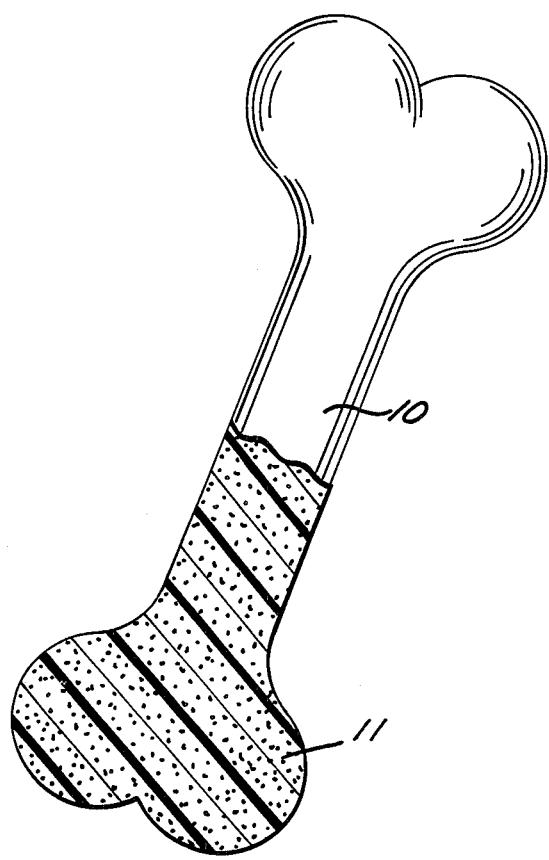

CHEWABLE OBJECT HAVING FLAVOR OR ODOR EXTRACT INCORPORATED THEREIN

BACKGROUND OF THE INVENTION

This invention generally relates to a chewable object which has an enjoyable flavor or exhibits an attractive odor.

Chewable objects perform a number of useful functions for pets, such as dogs and cats, namely, they provide exercise for the pets' jaw muscles, they massage the pets' gums and thus clean the pets' teeth. Young children also find such objects useful, particularly during periods of tooth eruption, in order to obtain relief by chewing on a firm but pliable object.

A variety of materials have been used for such chewable objects in the past. For example, rawhide, woven fabrics, or rope have been used but they are subject to breakdown from continued chewing and as a result they have not been found to be very satisfactory. More stable materials, such as rubber or plastic have also been utilized, to make chewable toys but frequently these materials have undesirable tastes.

Odor or flavor components have been applied to the surface of chewable objects to increase the attractiveness thereof, but these superficial flavors or odors quickly dissipate due to the exposure to the atmosphere or to chewing.

Methods have been developed (see U.S. Pat. No. 3,871,334 to Axelrod) to impregnate a chewable object formed from nylon with an aqueous-based flavor or odor extract and the chewable objects so treated have achieved substantial commercial success. However, nylon tends to be hard and relatively stiff, particularly during cold weather and furthermore it has a tendency to splinter and fray when subjected to vigorous mastication. Young animals find flavor-impregnated nylon objects very attractive but as the animals mature, they tend to discontinue chewing or otherwise playing with such nylon objects. The loss of interest has been attributed to the hardness of such nylon objects.

Edwards in U.S. Pat. No. 4,513,014 sought to provide a more chewable product comprising a polyurethane elastomer having incorporated therein flavor or odor extracts dissolved in an oil or wax carrier. These polyurethane products were designed so that the oil or wax-based flavor or odor extracts incorporated into the elastomer body bleed to the surface of the product so the flavor or odor lasts over an extended period. However, the oil or wax-based flavor or odor extracts which bleed to the surface readily rub off onto furniture, rugs, and the like, and, as a result, such objects were not very desirable for in-house use. The flavor or odor extracts also come off when the objects are manually handled such as when the pet owner plays with the object with his or her pet. It should be particularly noted that prior chewable objects have a very storng disagreeable ordor. Such odor is disliked by both pet store dealers and pet owners.

In the process described by Edwards the flavor or odor extracts are incorporated within the body of the polyurethane during the polymerization thereof or when the product was injection molded or otherwise formed. These processes may involve temperatures well above 300° F., which can change the flavors or odors considerably and while the flavors or odors therefrom may be attractive to the pets, they would not always be acceptable to the pet owner. It has also been found that by incorporating the oil or wax based flavors or odors into the polyurethane the physical and mechanical properties of the cured products were significantly reduced.

Nylon can absorb up to 8% by weight or more of water but polyurethanes and other plastic materials have a very low propensity to absorb water less than about 2%. As a result polyurethane has not been considered to be appropriate substrate for impregnation with water based odor or flavor extracts.

As a result, there has been a long-felt need for an improved, more chewable object having both an attractive flavor or odor and sufficient physical properties to avoid destruction when chewed. The present invention fulfills this need and provides further advantages.

SUMMARY OF THE INVENTION

This invention is directed to a durable, chewable object having a water based flavor or odor incorporated therein which is attractive to dogs.

The chewable object or toy in accordance with the present invention is a thermoplastic polyurethane body having a desirable shape such as an imitation dog bone shown in the drawing or solid ring or torus shape which has incorporated into the body thereof an aqueous-based flavor or odor extract. About 0.2 to about 2 percent (by weight) of an aqueous-based flavor or odor extract, which is attractive to the ultimate user is incorporated into the polyurethane body. Such levels of flavor or odor extract can be incorporated into the polyurethane body in less than about 2 hours. The odor is pleasant rather than disagreeable.

The preferred polyurethane is a polyester polyurethane formed by the reaction of aliphatic polycarboxylic acids having from 4 to 10 carbon atoms in the carbon chain and polyfunction isocyanates such as methylene dephenyl diisocyanates and toluene diisocyanate.

The chewable object of the invention is considerably more flexible and thus more chewable than nylon-based products and moreover the incorporation of the water based flavor or odor extract has relatively little ditrimental effect on the mechanical and physical properties of the shaped product because it is introduced by absorbtion after the bone is molded.

These and other advantages of the invention will become more apparent from the following detailed description thereof when taken in conjunction with the exemplary drawings.

BRIEF DESCRIPTION OF THE DRAWING

The drawing is a plan view partially in section of an imitation dog bone embodying features of the invention.

DETAILED DESCRIPTION OF THE INVENTION

The present invention is directed to an durable, chewable object formed from a thermoplastic polyurethane resin which has incorporated therein an aqueous-based flavor or odor extract after it is formed (molded).

The preferred polyurethane is a polyester polyurethane and particularly the reaction product of a polycarboxylic acid such as adipic acid and polyfunctional isocyanate such as methylene diphenyl diisocyanate. A very desirable material is a polyurethane elastomer sold by the Dow Chemical Company under the trademark Pellethane ® and particularly the polyurethane having the product identification of pellethane 2355-75A. This latter product is the reaction product of adipic acid and methylene diphenyl diisocyanate. It has excellent flexibility for chewing and yet has sufficient strength and toughness so that the material can withstand highly active mastication thereof by large animals.

The polyurethane body formed of the preferred composition absorbs sufficient amounts of an aqueous-based flavor or odor extract (about 0.5 to about 2% by weight, preferably about 0.75 to about 1.5% by weight) so that the object is attractive to dogs but such absorption does not significantly degrade the physical or mechanical properties of the polyurethane material. Moreover, the extract does not bleed to the surface of the product, does not rub off and cannot be tasted or smelled by humans.

It should be recognized that modifications can be made to the polyurethane composition such as by adjusting the ratio of reaction components or modifying the individual components in order to develop specific properties for particular end uses.

Preferably, flavor or odor extracts for dogs are from meat or animal by-products. It is to be recognized, however, that flavors or odors such as candy may be incorporated into the body for other end users, such as children.

The preferred process for incorporating water-based flavor or odor extracts generally follows the procedures described in U.S. Pat. No. 3,871,334 which is hereby incorporated in its entirety by reference. However, it has been found that with the present invention it is not necessary to treat polyurethane bodies with the aqueous based flavor or odor extract for the length of time described in the aforesaid reference to treat nylon products, i.e., three to twenty hours. Generally, it is found that treatment times less than about 2 hours are effective for polyurethane products, particularly polyester polyurethane products. A typical amount of aqueous base extract found to be effective is about 1%.

The polyurethane product of the invention is preferably formed by injection molding or prepolymerized pellets or granules of polyurethane at temperatures from about 300° to 450°, preferably about 350° to 425° F. Other methods such as extruding at such elevated temperatures can also be used. Care should be exercised to dehydrate the polymerized pellets or granules before the high temperature forming. At the high forming temperatures the polyurethane bond can be opened, exposing isocyanate end groups which readily react with moisture to form carbon dioxide gas. This can result in undesirable porosity, erratic processing, and poor physical and mechanical properties.

If desired, controlled addition of foaming agents can be incorporated into the reaction component, to produce a product having a higher specific gravity than $H_2O$ and thus float.

Typical properties of the preferred a polyadipate ester polyurethane, are provided in the table below.

TABLE I

| PROPERTIES | TEST METHODS | TYPICAL VALUE |
| --- | --- | --- |
| Melt Index gm/10 mm (224° C., 1200 g) | ASTM D-1238 | 20–25 |
| Hardness, Durometer, A Scale | ASTM D-2240 | 75–80 |
| Specific Gravity | ASTM D-792 | 1.17–1.21 |
| Tensile Stress, psi | | |
| @ 50% Elongation | ASTM D-412 | 400–450 |
| @ 100% Elongation | | 600–625 |
| @ 300% Elongation | | 1500–1575 |

TABLE I-continued

| PROPERTIES | TEST METHODS | TYPICAL VALUE |
| --- | --- | --- |
| Ultimate Tensile Strength, psi | ASTM D-412 | 4500–4700 |
| Ultimate Elongation, % | ASTM D-412 | 550–675 |
| Elongation Set After Break, % | ASTM D-412 | 20–40 |
| Tear Strength, Die "C" pli | ASTM D-624 | 400–500 |
| Compression Set, % | | |
| 22 hrs. @ 25° C. | ASTM D-395 | 20–30 |
| 22 hrs. @ 70° C. | Method B | 25–35 |
| Taber Abrasion[1], mg. loss | ASTM D-1044 | 25–30 |
| Clash-Berg Modulus, $T_f$, °C. | ASTM D-1043 | −48 |

Note that molded test pieces used to determine the above typical properties were post cured for 16 hours at 115° C. and for 7 days under ambient conditions prior to testing.

As an example of the present invention injection molded, bone shaped polyurethane products (such as shown in the drawing) of the preferred composition (Pellethane 2355-75A) were submerged in a ham flavored broth maintained at a temperature of about 150° for periods of 1, 2, and 12 hours. The specimens had a weight gain measured at ambient conditions of 1.1%, 1.1%, and 1.4%, respectively. All of the products had attractive flavor characteristics and were readily chewable by both large and small animals.

The polyurethane body of the present invention need not be thoroughly impregnated with the aqueous-based flavor or odor extract but the body should be impregnated to a significant depth not just on the surface of the object. The imitation dog bone 10 shown in drawing has as shaded area adjacent the surface exemplifies the depth of penetration by the aqueous based extract.

For pets, the preferred extracts are extracts of smoked ham, chicken, beef, and other meat by-products such as ham hocks, shank ends, turkey, or chicken necks, backs, and oxtails. For cats, catnip products can be incorporated. These flavors are readily sensed by those who chew the objects and there is no tendency for such flavor or odor extracts to rub off on furniture, rags and the like, so these objects can be used inside. The odors and flavors are usually not detectable by humans.

While the present invention has been described primarily in terms of a chewable object for pets, it is obvious that such products may be made suitable for children and others by incorporating a more appropriate flavor or odor extract. Moreover, other modifications and improvement can be made to the present invention without departing from the scope thereof.

What is claimed is:

1. A durable, chewable object consisting essentially of a polyurethane elastomeric body formed by the reaction of aliphatic dicarboxylic acid and aromatic diisocyanate and having from about 0.2 to about 2.5% by weight of an aqueous-based flavor or odor extract incorporated into the body after the forming thereof.

2. The durable, chewable object of claim 1 wherein the aliphatic dicarboxylic acid has from 4 to 10 carbon atoms in the carbon chain.

3. The durable, chewable object of claim 2, wherein the dicarboxylic acid is adipic acid and the diisocyanate is methylene diphenyl diisocyanate.

4. The durable, chewable object of claim 1 having a dog bone shape.

5. The durable, chewable object of claim 1 having a torus shape.

6. The durable, chewable object of claim 1 wherein the flavor or odor extract comprises an aqueous extract predominently of meat or meat by-products.

7. The durable, chewable object of claim 1 wherein the flavor or odor extract comprises an aqueous extract of candy.

8. The durable, chewable object of claim 1 wherein the flavor or odor extract comprises an aqueous extract of catnip.

9. The durable, chewable object of claim 1 wherein the elastomeric body contains from about 0.5 to about 2% by weight of an aqueous based flavor or odor extract incorporated therein.

* * * * *